(12) United States Patent
Lee

(10) Patent No.: US 7,441,795 B2
(45) Date of Patent: Oct. 28, 2008

(54) AIR BAG MODULE

(75) Inventor: Jung Su Lee, Sungnam-si (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 322 days.

(21) Appl. No.: 11/305,094

(22) Filed: Dec. 19, 2005

(65) Prior Publication Data

US 2007/0035110 A1 Feb. 15, 2007

(30) Foreign Application Priority Data

Aug. 9, 2005 (KR) .................. 10-2005-0073022

(51) Int. Cl.
*B60R 21/16* (2006.01)
(52) U.S. Cl. ............... 280/728.2; 280/728.1; 280/743.1
(58) Field of Classification Search ............ 280/728.2, 280/728.1, 743.1, 743.2, 735, 736, 741, 742
See application file for complete search history.

(56) References Cited

U.S. PATENT DOCUMENTS 4,006,919 A * 2/1977 Neuman ................. 280/736
6,334,627 B1 1/2002 Heym et al.
6,581,964 B2 * 6/2003 Braunschadel ........... 280/743.2
7,240,917 B2 * 7/2007 Fogle et al. .................. 280/739
2005/0035582 A1 2/2005 Kim
2005/0082807 A1 4/2005 Kwon

FOREIGN PATENT DOCUMENTS

JP 2001-199299 7/2001
KR 2003-016896 3/2003

OTHER PUBLICATIONS

English Language abstract of JP 2001-199299.
English Language abstract of KR 2003-0016896.
U.S. Appl. No. 11/305,089, filed Dec. 19, 2005.

* cited by examiner

*Primary Examiner*—Eric Culbreth
(74) *Attorney, Agent, or Firm*—Greenblum & Bernstein, P.L.C.

(57) ABSTRACT

An air bag module has a cushion size adjusting mechanism mounted for folding a part of a cushion and holding the same in an air bag housing. Thus, the expansion size of the cushion can be adjusted according to the expansion pressure of the inflator because if the expansion pressure of an inflator is large, the cushion is expanded to a full expansion size, thereby improving the performance and reliability. The cushion size adjusting mechanism is mounted to the air bag housing, thereby preventing accidents such as bruises caused when the cushion size adjusting mechanism is exposed to the outside.

9 Claims, 5 Drawing Sheets

AIR BAG MODULE

This Nonprovisional application claims priority under 35 U.S.C. § 119(a) on Patent Application No. 10-2005-73022 filed in Korea on Aug. 9, 2005, the entire contents of which are hereby incorporated by reference.

BACKGROUND OF THE INVENTION

1. Field of the Invention

The present invention relates to an airbag Module, and more particularly, to an airbag device which can adjust the expansion size of a cushion according to the expansion pressure of an inflator at the time of expansion.

2. Description of the Conventional Art

Generally, an air bag for vehicles may be classified into a driver air bag (DAB) which is mounted to a steering wheel to protect the driver in a driver's seat and a passenger air bag (PAB) which is mounted to an instrument panel in front of a passenger's seat for protecting the passenger in a passenger's seat. Basically, the driver air bag is requisite, and the passenger air bag is optional; however, vehicles with passenger air bags basically mounted therein for protecting passengers from injury are on the increase in recent years.

FIG. 1 is a cross sectional view of an air bag module according to the conventional art.

As shown in FIG. 1, the air bag module comprises: an air bag housing 2 fixed to a vehicle; a cushion 4 accommodated in the front part of the air bag housing 4; and an inflator mounted to the rear part of the air bag housing 2 for supplying a high pressure expansion gas so that the cushion 4 is expanded toward a passenger when a collision having a severity greater than a predetermined severity occurs.

A retainer 8 having a plurality of retainer holes 8a for passing the expansion gas supplied by the inflator 6 through is disposed between the cushion 4 and the inflator 6.

The expansion pressure of the inflator 6 is adjusted according to the type of a passenger in accordance with a physical condition of the passenger.

The operation of the thus-constructed air bag module according to the conventional art will now be described.

When a collision having a severity greater than a predetermined severity occurs, a high pressure expansion gas is emitted from the inflator 6. The high pressure expansion gas emitted from the inflator 6 fills the cushion 4. As the cushion 4 inflates like a balloon by the high pressure expansion gas supplied from the inflator 6, it is expanded toward a passenger's seat. Then, as illustrated in FIG. 2, the passenger sitting on the passenger seat can be protected by the buffering action of the cushion 4.

The conventional air bag module, however, is designed to be perfectly expanded by conforming the size of the cushion 4 to a state in which an adult man of standard proportions is seated in an upright position. Thus, in case that the expansion pressure of the inflator 6 is adjusted according to the type of a passenger other than an adult man, the expansion size of the cushion 4 is not appropriate, thereby deteriorating the function.

Japanese Laid-Open Patent No. 2001-199299 discloses an air bag module which is provided with an additional cushion capable of adjusting the size of the air bag, supports the additional cushion by a retainer ring and a supporting device, and has a release device for releasing the supporting. However, its structure is complicated and the cost is increased due to the release device.

Korean Laid-Open Patent No. 2003-0016896 discloses an air bag cushion which is provided with an expansion size adjusting portion, with a seam being gradually torn according to a pressure, by sewing parts of the air bag with a thread such that the size of the air bag can be adjusted. However, there is a problem of having to precisely control the strength or thickness of the thread in order to precisely control the tearing of the thread according to a pressure.

U.S. Pat. No. 6,334,627 discloses a variable-volume airbag for an airbag module in which a tab is attached to the part exposed to the outside at the time of expansion of the airbag and the tab is bound with a cord, or in which a tab connected with an islet is attached to the part exposed to the outside at the time of expansion of the airbag and the islet is bound with a cord or hook. However, the passenger may get a bruise caused by the tap, islet, cord and so on at the time of expansion of the airbag, and a particular process for attaching the tab to the airbag with a thread or the like is required, which makes the working process complicated.

SUMMARY OF THE INVENTION

Therefore, the present invention has been made in view of the above problems, and it is an object of the present invention to provide an air bag module which can adjust the expansion size of a cushion perfectly according to the expansion pressure of an inflator.

It is another object of the present invention to provide an air bag module which can prevent accidents such as bruises caused by a structure for adjusting the expansion size of a cushion.

To achieve the above objects, there is provided an air bag module according to the present invention, comprising: an airbag housing; a cushion accommodated in the air bag housing while being folded; an inflator for supplying a predetermined expansion pressure such that the cushion is expanded at the time of collision; and a cushion size adjusting mechanism mounted to the air bag housing for folding parts of the cushion and holding the same in the air bag housing, so that the expansion size of the cushion is adjusted according to the expansion pressure of the inflator.

The cushion size adjusting mechanism includes: a clip stud consisting of a pin portion passing through the expansion size boundary region of the cushion and the air bag housing and a head portion being torn according to the expansion pressure of the inflator; and a clip nut fastened to the end of the pin portion of the clip stud.

The clip stud is formed of plastic material.

The head portion of the clip stud is attached to the outer surface of the cushion.

The clip stud has a cut line formed on the boundary of the head portion and pin portion.

The air bag housing has a through hole for passing the pin portion of the clip stud through.

An inlet end of the cushion opened so as to introduce the expansion pressure of the inflator thereinto is fixed in the middle of the air bag housing through a retainer.

The retainer has a through hole for passing the pin portion of the clip stud through.

The air bag module further comprises a control portion for controlling the expansion pressure of the inflator in multiple stages according to passenger type information.

The air bag module further comprises a passenger sensor for sensing passenger type information and outputting the same to the control portion.

The thus-constructed air bag module according to the present invention can adjust the expansion size of the cushion according to the expansion pressure of the inflator because if the expansion pressure of the inflator is small, the cushion is expanded by the cushion size adjusting mechanism while being folded in the air bag housing, and if the expansion pressure of the inflator is large, the cushion is expanded to a full expansion size, thereby improving the performance and reliability.

Furthermore, since the cushion size adjusting mechanism includes: a clip stud consisting of a pin portion passing through the expansion size boundary region of the cushion and the air bag housing and a head portion being torn according to the expansion pressure of the inflator; and a clip nut fastened to the end of the pin portion of the clip stud, it is possible to prevent accidents caused by the pin portion of the clip stud and the clip nut because the pin portion of the clip stud and the clip nut are left in the air bag housing at the time of expansion of the cushion.

Furthermore, the head portion of the clip stud is attached to the air bag housing, thereby preventing accidents caused by the head portion which may occur when the head portion is torn and bounced.

Furthermore, since a cut line is formed on the boundary of the head portion and pin portion of the clip stud, the head portion can be easily torn, it is possible to prevent a malfunction which occurs when the head portion is not torn, and the expansion size of the air bag can be precisely controlled.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENTS

Hereinafter, embodiments of an air bag module according to the present invention will now be described with reference to the accompanying drawings.

Figure 1:
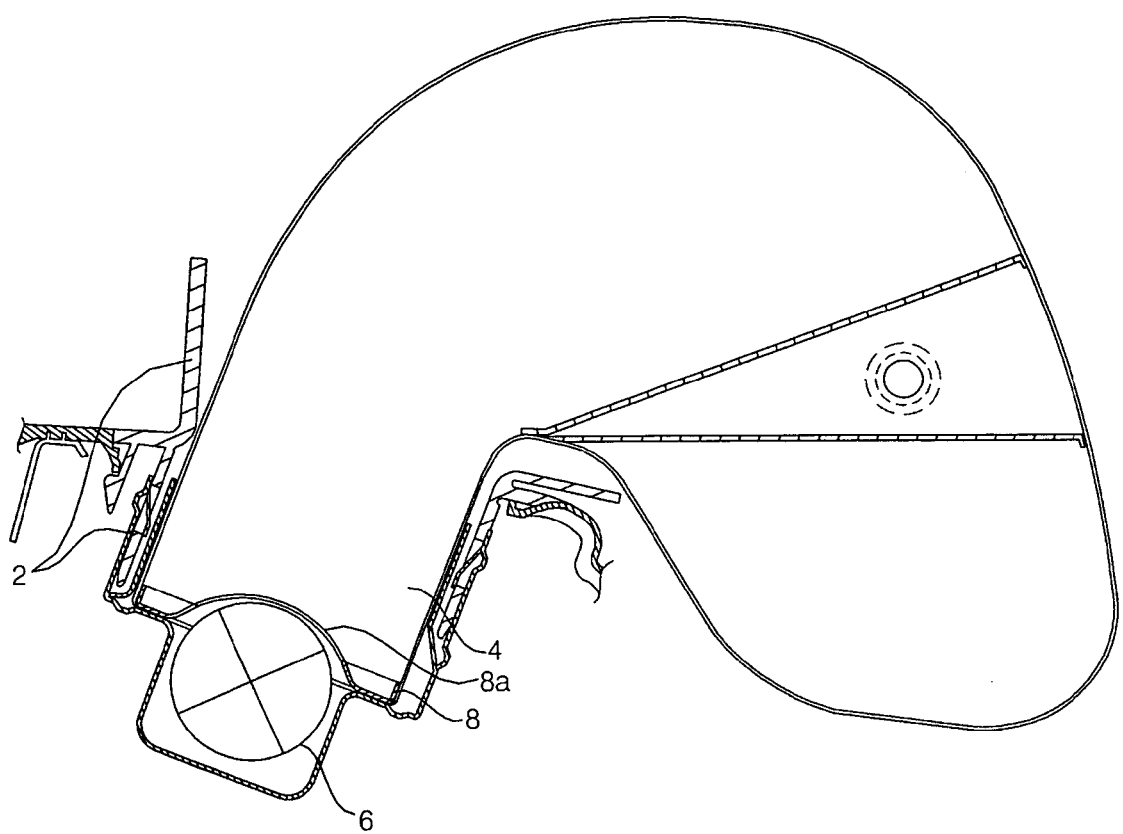
FIG. 1 is a cross sectional view of an air bag module according to the conventional art.
Figure 2:
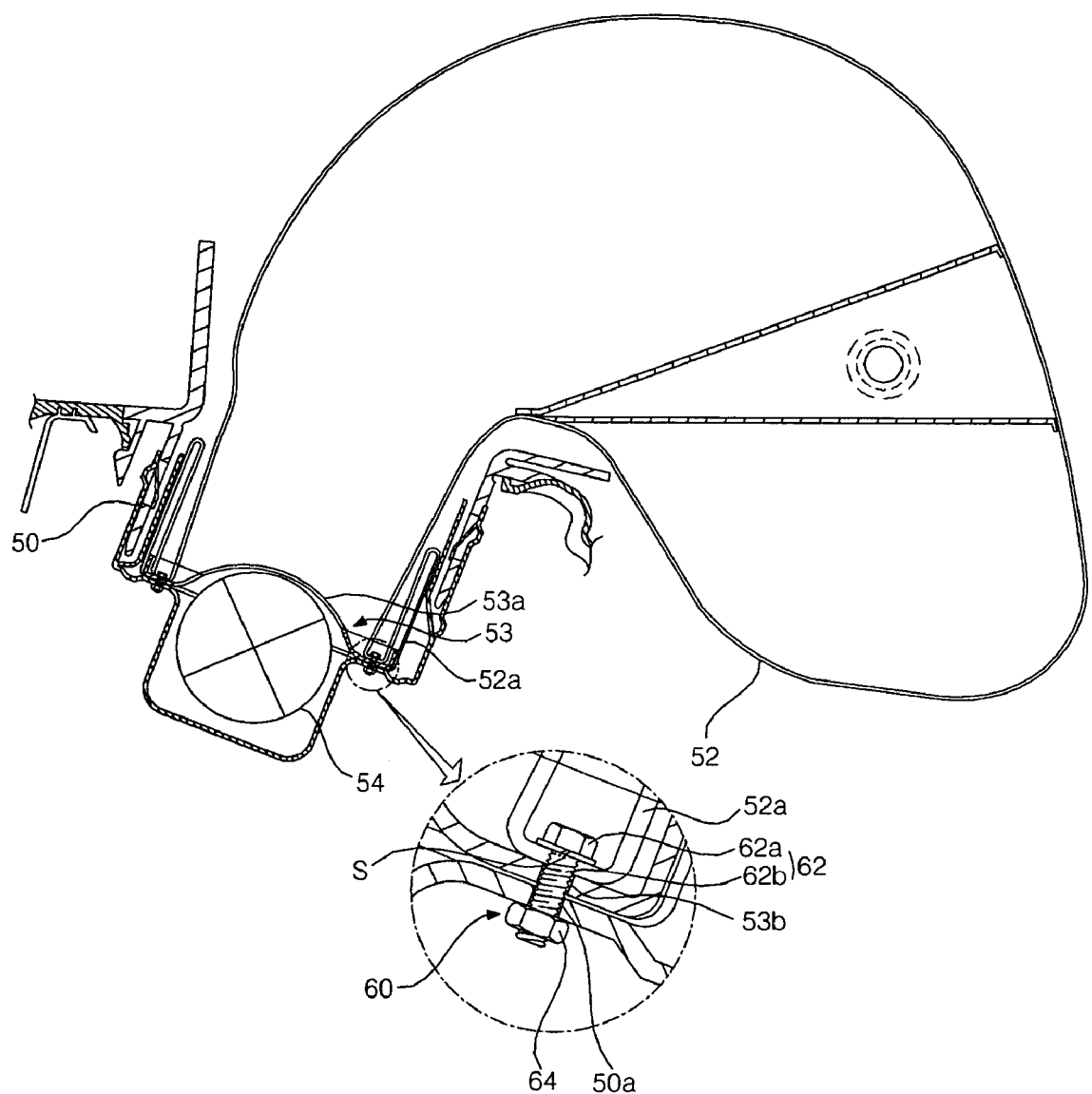
FIG. 2 is a cross sectional view of the expansion of a child class air bag according to one embodiment of the present invention.
Figure 3:
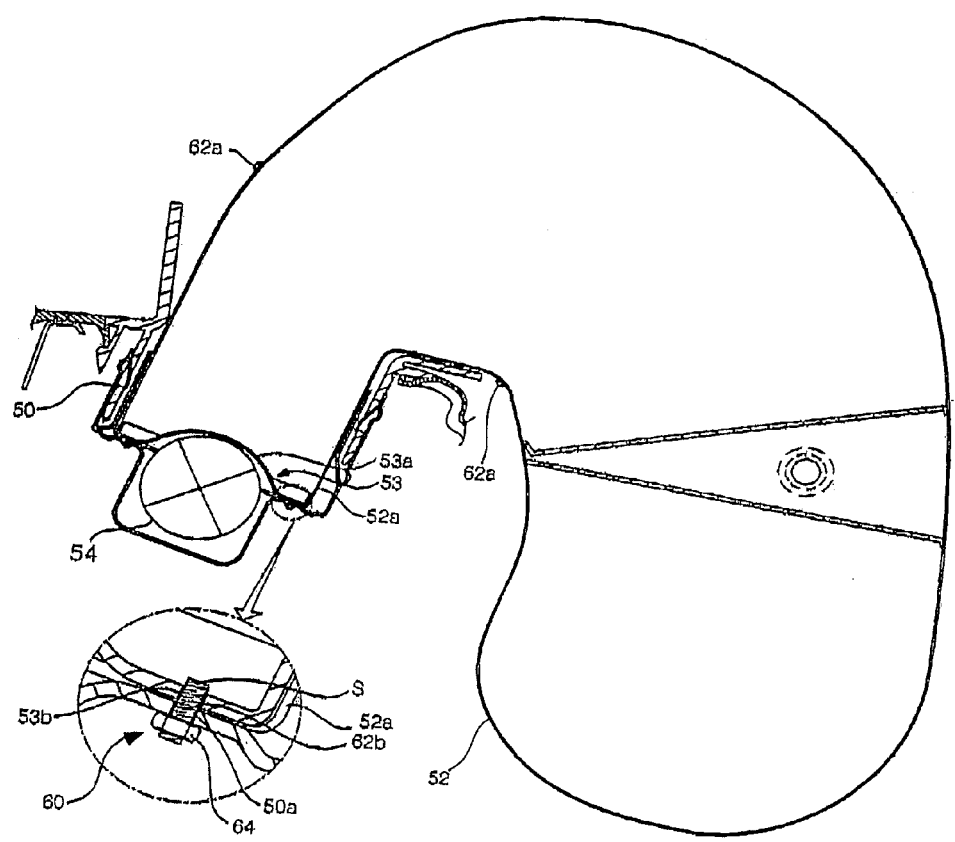
FIG. 3 is a cross sectional view of the expansion of an adult class airbag according to the one embodiment of the present invention.

FIG. 2 is a cross sectional view of the expansion of a child class air bag according to one embodiment of the present invention. FIG. 3 is a cross sectional view of the expansion of an adult class airbag according to the one embodiment of the present invention.

As shown in FIGS. 2 and 3, the air bag module of the present invention comprises: an air bag housing 50 fixed to a vehicle; a cushion 52 accommodated in the front part of the air bag housing 50 while being folded to a predetermined size; and an inflator 54 mounted to the rear part of the air bag housing 50 for supplying a high pressure expansion gas so that the cushion 52 is expanded at the time of collision; and a cushion size adjusting mechanism mounted to the air bag housing 50 for folding a part 52a of the cushion 52 and holding the same in the air bag housing 50, so that the expansion size of the cushion 52 is adjusted according to the expansion pressure of the inflator 54.

On the air bag housing 50, a through hole 50a for passing parts of the cushion size adjusting mechanism 60 through is formed.

An inlet end of the cushion 52 opened so as to introduce the expansion pressure of the inflator 54 thereinto is fixed in the middle of the air bag housing 50 through a retainer 53.

The retainer 53 is provided integral with a retainer stud (not shown) for fixing the opened inlet end of the cushion 52 to the air bag housing 50. Of course, a retainer nut (not shown) is fastened to the end of the retainer stud so that the cushion 52 and the retainer 53 do not fall off from the air bag housing 50.

On the retainer 53, at least one retainer hole 53a is formed for passing the expansion pressure of the inflator 54 through.

On the retainer 53, a through hole 53b for passing parts of the cushion size adjusting mechanism 60 through is formed.

The expansion pressure of the inflator 54 is controlled in multiple stages according to the type of a passenger in accordance with a physical condition of the passenger, a sitting position of the passenger, etc.

The type of a passenger may be classified into, for example, an adult class which standardizes on adult men of standard proportions and occupants in an upright position, i.e., in position, and a child class which standardizes on adult women built weaker than adult men of standard proportions or children and out-of-position occupants.

Figure 4:
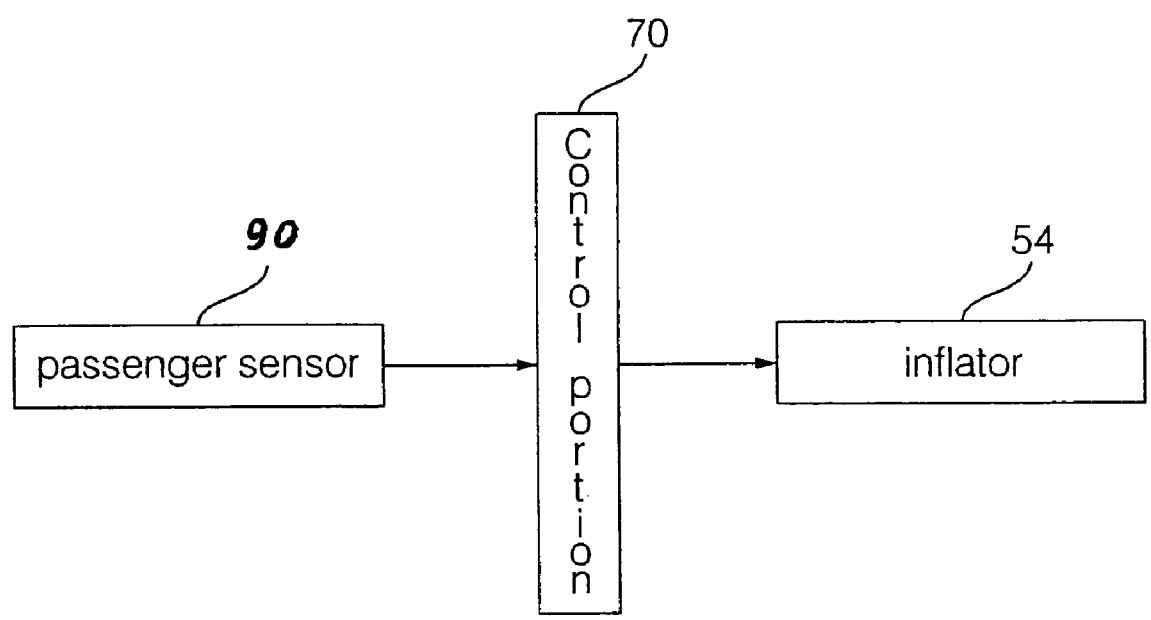
FIG. 4 is a control block diagram of the one embodiment of the present invention.

FIG. 4 is a control block diagram of the one embodiment of the present invention.

The air bag module further comprises a passenger sensor 90 provided in the seat occupied by a passenger for sensing the load of the passenger to be protected, the pressure distribution of the passenger on the seat and so on and a control portion 70 for controlling the expansion pressure of the inflator 54 in multiple stages according to passenger type information sensed by the passenger sensor 90.

The expansion pressure of the inflator 54 is set to 100% in case of the adult class passenger type, and set to a pressure lower than that of the adult class passenger type in case of the child class passenger type.

For instance, if the weight of a passenger sensed by the passenger sensor 60 is greater than 30 kg, the control portion 70 judges that the passenger is an adult class passenger and sets the expansion pressure of the inflator 54 to 100%. If the weight of a passenger sensed by the passenger sensor 60 is less than 30 kg, the control portion 70 judges that the passenger is a child class passenger and sets the expansion pressure of the inflator 54 to 50%.

The cushion size adjusting mechanism 60 folds a peripheral portion 52a of the opened inlet end of the cushion 52 such that the cushion size adjusting mechanism 60 does not cause accidents such as bruises when the cushion 52 is fully expanded.

As shown in FIGS. 2 and 3, the cushion size adjusting mechanism 60 includes: a clip stud 62 consisting of a head portion 62a disposed in the air bag housing 50 being torn according to the expansion pressure of the inflator 54 and a pin portion 62b passing through the expansion size boundary region of the cushion 52 and the air bag housing 50 and a clip nut 64 fastened to the end of the pin portion 62b of the clip stud 62 in the outer side of the air bag housing 50.

Welding and coupling may be performed on the pin portion 62b of the clip stud 62, rather than the head portion 62a of the clip stud 52, so that the head portion 62a of the clip stud 62 can be torn from the clip stud 62 according to the expansion pressure of the inflator 54.

Alternately, a cut line S may be formed on the boundary between the head portion 62a of the clip stud 62 and the pin portion 62b of the clip stud 62 in order to tear the head portion 62a of the clip stud 62.

The head portion 62a of the clip stud 62 is preferably formed to be low in height so as to make it easier to tear the head portion 62a, and preferably made of plastic material.

The operation of the present invention thus-constructed will now be described.

When a collision occurs, the expansion pressure of the inflator 54 is set according to the type of a passenger, and thereafter the expansion pressure set up from the inflator 54 is supplied to the cushion 52.

Then, the cushion 52 is expanded toward a passenger by the expansion pressure supplied from the inflator 54.

At this point, if the type of a passenger is the child class, the expansion pressure of the inflator 54 set up according to the child class passenger type is not 100%, thereby maintaining the head portion 62a of the clip stud 62 not to be torn.

Therefore, as the cushion 52 is expanded while parts thereof being folded, it is expanded to a size smaller than the full expansion size of the cushion 52.

On the other hand, if the passenger type is the adult class, the expansion pressure of the inflator 54 is 100%, and thus the head portion 62a of the clip stud 62 is torn by the expansion force of the cushion 53, thereby expanding the cushion 53 to a full expansion size.

Figure 5:
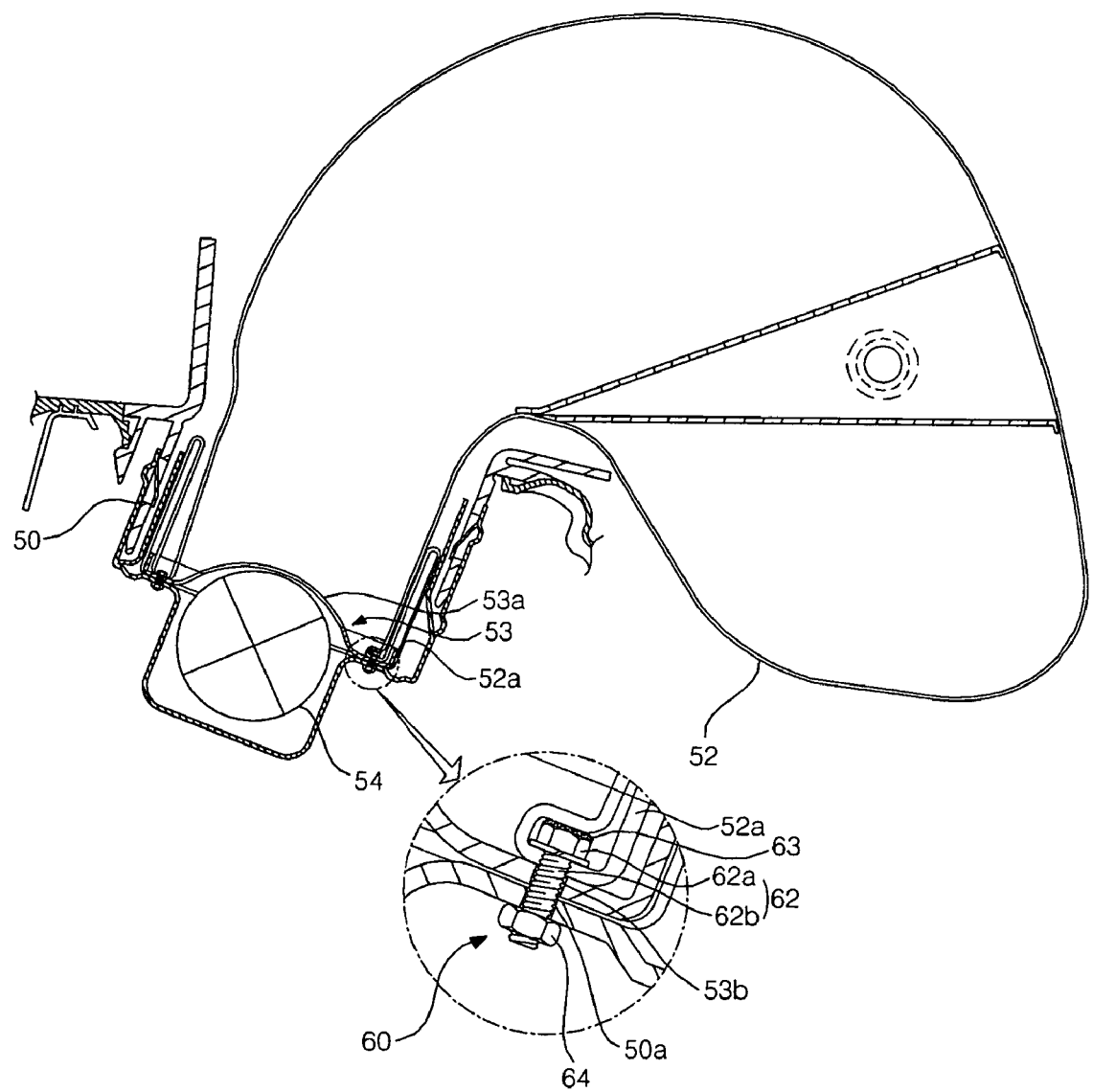
FIG. 5 is a cross sectional view of the expansion of a child class airbag according to another embodiment of the present invention.

FIG. 5 is a cross sectional view of the expansion of a child class according to another embodiment of the present invention.

As shown in FIG. 5, when the head portion 62a is torn from the clip stud 62 so that the cushion 52 is expanded to a full size, the head portion 62a is bonded to the cushion 52 by an adhesive 63 or the like so that the head portion 62a is attached to the cushion 52.

Since other constructions and operations are the same as those of the first embodiment except for the bonding structure of the head portion 62a, the same reference numerals are used and a detailed description thereof will be omitted.

The effects of the thus-constructed air bag module according to the present invention will now be described.

The air bag module according to the present invention can adjust the expansion size of the cushion according to the expansion pressure of the inflator because if the expansion pressure of the inflator is small, the cushion is expanded by the cushion size adjusting mechanism while being folded in the air bag housing, and if the expansion pressure of the inflator is large, the cushion is expanded to a full expansion size, thereby improving the performance and reliability.

Furthermore, since the cushion size adjusting mechanism includes: a clip stud consisting of a pin portion passing through the expansion size boundary region of the cushion and the air bag housing and a head portion being torn according to the expansion pressure of the inflator; and a clip nut fastened to the end of the pin portion of the clip stud, it is possible to prevent accidents caused by the pin portion of the clip stud and the clip nut because the pin portion of the clip stud and the clip nut are left in the air bag housing at the time of expansion of the cushion.

Furthermore, the head portion of the clip stud is attached to the air bag, thereby preventing accidents caused by the head portion which may occur when the head portion is torn and bounced.

Furthermore, since a cut line is formed on the boundary of the head portion and pin portion of the clip stud, the head portion can be easily torn. Therefore, it is possible to prevent a malfunction which occurs when the head portion is not torn, and the expansion size of the air bag can be precisely controlled.

What is claimed is:

1. An air bag module, comprising:
   an air bag housing;
   a cushion accommodated in the air bag housing while being folded;
   an inflator which supplies a predetermined expansion pressure such that the cushion is expanded at the time of collision; and
   a cushion size adjusting mechanism mounted to the air bag housing, the cushion size adjusting mechanism being configured to fold parts of the cushion and hold the cushion in the air bag housing, so that an expansion size of the cushion is adjusted according to the expansion pressure of the inflator,
   wherein the cushion size adjusting mechanism comprises:
   a clip stud having a pin portion passing through an expansion size boundary region of the cushion, and the air bag housing and a head portion of the clip stud is configured to be torn by the expansion pressure of the inflator; and
   a clip nut fastened to the end of the pin portion of the clip stud.

2. The air bag module of claim 1, wherein the clip stud comprises plastic material.

3. The air bag module of claim 1, wherein the head portion of the clip stud is attached to an outer surface of the cushion.

4. The air bag module of claim 1, wherein the clip stud has a cut line formed on a boundary of the head portion and pin portion.

5. The air bag module of claim 1, wherein the air bag housing has a through hole configured to receive the pin portion of the clip stud therethrough.

6. The air bag module of claim 1, wherein an inlet end of the cushion opened so as to introduce the expansion pressure of the inflator thereinto is fixed in the middle of the air bag housing through a retainer.

7. The air bag module of claim 6, wherein the retainer has a through hole configured to receive the pin portion of the clip stud therethrough.

8. The air bag module of claim 1, further comprising a control portion configured to control the expansion pressure of the inflator in multiple stages according to passenger type information.

9. The air bag module of claim 1, further comprising a passenger sensor which senses passenger type information and and outputs the passenger type information to a control portion configured to control the expansion pressure of the inflator.

* * * * *

UNITED STATES PATENT AND TRADEMARK OFFICE
CERTIFICATE OF CORRECTION

PATENT NO.      : 7,441,795 B2
APPLICATION NO. : 11/305094
DATED           : October 28, 2008
INVENTOR(S)     : Jung Su Lee It is certified that error appears in the above-identified patent and that said Letters Patent is hereby corrected as shown below:

At column 6, line 55 (claim 9, line 3) of the printed patent, delete "and" (second occurrence).

Signed and Sealed this

Twenty-third Day of June, 2009

JOHN DOLL
*Acting Director of the United States Patent and Trademark Office*